US006940653B2

(12) United States Patent
Favalora et al.

(10) Patent No.: US 6,940,653 B2
(45) Date of Patent: Sep. 6, 2005

(54) RADIATION CONDITIONING SYSTEM

(75) Inventors: Gregg E. Favalora, Arlington, MA (US); Joshua Napoli, Winchester, MA (US); David-Henry Oliver, Brookline, MA (US)

(73) Assignee: Actuality Systems, Inc., Burlington, MA (US)

( * ) Notice: Subject to any disclaimer, the term of this patent is extended or adjusted under 35 U.S.C. 154(b) by 0 days.

(21) Appl. No.: 10/324,410

(22) Filed: Dec. 19, 2002

(65) Prior Publication Data

US 2003/0151821 A1 Aug. 14, 2003

Related U.S. Application Data

(60) Provisional application No. 60/341,901, filed on Dec. 19, 2001, and provisional application No. 60/407,904, filed on Sep. 3, 2002.

(51) Int. Cl.[7] .......................... G02B 27/10; G03H 1/00; G03H 1/22; H04N 13/00; H04N 15/00
(52) U.S. Cl. ........................... 359/619; 359/1; 359/11; 359/22; 359/23; 359/24; 359/32; 348/40; 348/41
(58) Field of Search ................................. 359/1, 11, 32, 359/22–25, 619; 348/40, 41

(56) References Cited

U.S. PATENT DOCUMENTS 3,619,033 A * 11/1971 McMahon ................... 359/565
5,172,251 A * 12/1992 Benton et al. .................. 359/9

(Continued)

FOREIGN PATENT DOCUMENTS

| EP | 0 860 728 A1 | 8/1998 |
|---|---|---|
| WO | WO 00/75698 | 12/2000 |
| WO | WO 01/78409 | 10/2001 |
| WO | WO 01/088598 | 11/2001 |
| WO | WO 02/39194 | 5/2002 |

OTHER PUBLICATIONS

Slinger et al., "Progress and prospects for practical electro-holographic display systems", Practical Holography XV and Holographic Materials VII, Proceedings of SPIE vol. 4296 (2001), pp. 18–32.

(Continued)

*Primary Examiner*—Hung Xuan Dang
*Assistant Examiner*—Joseph Martinez
(74) *Attorney, Agent, or Firm*—Cantor Colburn LLP

(57) ABSTRACT

A holographic imaging system and method includes a radiation source for generating radiation. A data base has a set of elements, each element is indicative of a trajectory of a light ray exiting a point in a recorded scene. A spatial light modulator is receptive of the radiation from the radiation source and the elements of the data base mapped to the spatial light modulator, thereby projecting from the spatial light modulator an optical signal in the nature of a two dimensional bitmap of the recorded scene. A diffractive optical element includes a set of basis fringes receptive of the projected optical signal from the spatial light modulator for diffracting the optical signal in a specified direction. A multiplexer is receptive of the elements of the data base for multiplexing the elements of the data base to the spatial light modulator. A timing device synchronizes multiplexing the elements of the data base to the spatial light modulator and diffracting the optical signal in a specified direction.

26 Claims, 10 Drawing Sheets

U.S. PATENT DOCUMENTS

| | | | | |
|---|---|---|---|---|
| 5,801,761 | A | | 9/1998 | Tibor .......................... 348/51 |
| 5,808,792 | A | * | 9/1998 | Woodgate et al. .......... 359/463 |
| 5,815,314 | A | | 9/1998 | Sudo .......................... 359/472 |
| 5,907,312 | A | | 5/1999 | Sato et al. .................... 345/31 |
| 5,926,294 | A | | 7/1999 | Sato et al. .................... 359/22 |
| 5,959,664 | A | * | 9/1999 | Woodgate .................... 348/59 |
| 6,201,565 | B1 | | 3/2001 | Balogh ........................ 348/40 |
| 2002/0135673 | A1 | | 9/2002 | Favalora et al. |

OTHER PUBLICATIONS

Ritsuko Kishigami et al., "Real-time color three-dimensional display system using holographic optical elements", Practical Holograph XV and Holographic Materials VII, Proceedings of SPIE vol. 4296 (2001), pp. 102–107.

Leroy D. Dickson et al., "Holograph in the IBM 3687 Supermarket Scanner", IBM J. Res. Develop., vol. 26, No. 2, Mar. 1982, pp. 228–234.

Bahram Javidi et al., "Three-Dimensional Video and Display: Devices and Systems", Proceedings of a conference held Nov. 5–6, 2000, Boston, MA, SPIE Optical Engineering Press.

* cited by examiner $$F = A \sin\left(\frac{\alpha}{2}\right) + B$$

RADIATION CONDITIONING SYSTEM

CROSS-REFERENCE TO RELATED APPLICATIONS

This application claims the benefit of U.S. Provisional Patent Application Ser. No. 60/341,901, filed Dec. 19, 2001, which is incorporated herein by reference thereto as if set forth at length.

This application claims the benefit of U.S. Provisional Patent Application Ser. No. 60/407,904, filed Sep. 3, 2002, which is incorporated herein by reference thereto as if set forth at length.

BACKGROUND

This disclosure relates generally to electronic display technology and more specifically to multi-view three-dimensional parallax displays.

It is known that it is possible to create a three-dimensional image by approximating the wavefronts that emanate from three-dimensional (3-D) scenes. One such class of displays contains "parallax displays," which project the appearance of a 3-D scene from multiple viewpoints. Parallax displays generally allow a viewer to move his head horizontally and/or vertically to inspect the 3-D scene from different viewpoints. FIG. 1 illustrates a generalized parallax display 10.

In FIG. 1, a 3-D image 20 is projected by the parallax display 10 due to rays emerging from image plane (or hologram plane) 40 which enter the eyes of a viewer at location A or B. In general, an illumination source 50, which is typically a collimated laser beam, a sequence of 2D bitmapped images, or a single 2D image composed of interdigitated 2D views, passes light through a light steering and shaping element 55.

There are several specific ways to construct parallax displays. One approach utilizes a lens sheet, such as a lenticular lens array or a holographic optical element of similar function, to map a field of interdigitated images to their corresponding nearest viewpoints. In this way, a user walking around the parallax display will see a series of images that approximate the scene's appearance from the corresponding viewpoints. In FIG. 2, a lenticular lens sheet 52 includes an array of lenticular lenses 54 on at least one of its surfaces. Lenticular lens sheet 52 enables the parallax display 10 to project different imagery for different viewing angles. If properly registered imagery is projected onto the screen, or if the screen is overlaid on an image source such as a liquid crystal display (LCD), the system will provide imagery that provides correct perspective and parallax and also has variable transparency so that objects may occlude each other. This requires computing image data from several viewpoints for each projected frame. Though lenticular lenses and lens arrays are well known in the art, a brief description of how they work will be provided.

A widely known embodiment of a lenticular lens array is a lenticular lens sheet. It includes a sheet with a plurality of adjacent, parallel, elongated, and partially cylindrical lenses and multiple (e.g. two) interleaved lenses on the sheet. In general, the plurality of lenses enables the multiple interleaved images to be displayed on the underlying sheet but only one of the images will be visible from any given vantage point above the sheet.

The underlying principle which explains this is illustrated in FIG. 2, which presents a schematic side view of a lenticular lens sheet 52 with a plurality of lens elements 54(1-3). The image on the underlying sheet is represented by pixels 56–58. In this example, three image pixels, identified by suffixes "a", "b", and "c", respectively, are shown under each lens element 54. Thus, for example, under lens element 54(1) there are three associated pixels, namely 56a, 56b, and 56c.

If a person views the sheet from location "A", lens element 54(1), because of its focusing ability, allows that person to see light from pixel 56a. That is, of the light which lens element 54(1) collects, it only sends toward the person at location "A" that light which is collected from pixel element 56a. The rest of the light which lens element 54(1) collects from other locations under the lens is sent off in other directions and will not be seen by a person at location "A". For similar reasons, a person at location "B" only sees light emanating from pixel 56b, but does not see light emanating from other locations under lens element 54(1).

In U.S. Pat. No. 5,172,251, Benton and Kollin disclose a three dimensional display system. More recently, Eichenlaub et al (Proc. SPIE, 3639, p. 110–121, 1999) disclosed a discrete light field display, which produces up to 24 discrete viewing zones, each with a different or pre-stored image. As each of the observer's eyes transitions from one zone to another, the image appears to jump to the next zone.

In practice, parallax displays are problematic. In general, there is significant noticeable light emitted in inappropriate directions, causing imagery from wrong viewpoints to be visible. Furthermore, image realism is reduced because practical constraints limit the number of views that can be handled by each lens element. For example, the pixel density and the number of viewpoints are bounded by diffraction effects and brightness requirements. Also, many known lenticular sheet parallax displays produce undesirable dark bands as the viewer transitions between viewpoints. Therefore a parallax display with a large (i.e., 100+) number of viewpoints, high resolution, high brightness, and smooth transition between view zones is desired.

It is necessary to more closely approximate the light field generated by a 3D scene than by using lenticular sheets. A subset of the parallax display set contains holographic displays and holographic stereograms. A holographic video ("holovideo") system creates 3D imagery that looks realistic, appears to float inside or outside of a viewing zone or panel, and exhibits motion parallax. Holovideo provides the monocular and binocular depth cues of shading, motion parallax, and viewer-position-dependent reflection and hidden-surface removal.

One group of systems was created at the Massachusetts Institute of Technology (MIT) Media Laboratory that in general creates holographic video by scanning the image of an acousto-optic scanner over a vertical diffuser. This is illustrated in FIG. 3.

An idealized holographic stereogram emits light from each holographic pixel (or "hogel") in a way that allows a horizontally-moving viewer to see a continuous range of perspectives. See FIG. 5A. Here, the hologram plane 340 is decomposed into hogels such as hogel 341. A continuous range of viewer locations is shown.

Existing synthetic holographic stereograms sample the parallax views. Sampled parallax is shown in FIG. 5B. Scene parallax is captured from a finite set of directions, and is then re-projected back in those same capture directions. In order to prevent gaps between parallax views in the view zone, each view is uniformly horizontally diffused over a small angular extent.

Two things are needed to generate a holographic stereogram in this fashion: a set of N images that describe scene parallax, and a diffraction pattern that relays them in N different directions. In the case of the MIT Media Laboratory's holographic video system, a set of N diffractive elements, called basis fringes, are computed. When illuminated, these fringes redirect light into the view zone as shown in FIG. 6. These diffractive elements are independent of any image information, but when one is combined with an image pixel value, it directs that pixel information to a designated span in the view zone. FIG. 6 shows three basis fringes, 355, 360, and 365 for three spatial frequencies. To the right of each basis fringe is shown an example of repeating that basis fringe across a hologram line. Basis fringe 355 is repeated across a hologram line 342 and is illuminated by illumination 350, resulting in output 356 with a trajectory determined by basis fringe 355. Likewise, basis fringe 360 of higher frequency is repeated across a hologram line 343 and is illuminated by illumination 350, resulting in output 361 with a different trajectory and similarly for 365.

There are several ways to infer what basis fringes are required to generate a 3D scene. A typical method is to capture a scene using computer-graphic methods from N different directions. This method is illustrated in FIG. 7. In FIG. 7, to capture or render scene parallax information, cameras are positioned along a linear track, with the view also normal to the capture plane. N views are generated from locations along the track that correspond with center output directions of the basis fringes. In this type of horizontal parallax only (HPO) computed stereogram, correct capture cameras employ a hybrid projection—perspective in the vertical direction and orthographic in the horizontal. A desired 3D scene 2 is positioned near a capture plane 4. A set of cameras, $C_0$, $C_1$, and $C_{N-1}$, are illustrated taking snapshots of the scene 2 from a series of viewpoints.

Once N parallax views have been generated, the MIT group combines them with the N pre-computed basis fringes to assemble a holographic stereogram. In practice, this scene reconstruction is achieved using the apparatus illustrated in FIG. 3. The acousto-optical modulators (AOM) produce a stream of weighted linear combinations of basis vectors, as a function of the data compiled from the step illustrated in FIG. 7.

As described, the handful of existing systems decompose a synthetic hologram plane into spectrally-homogenous regions called hogels, each of which is "projected" in its entirety by a spatial light modulator (SLM) or acousto-optical modulator. An acousto-optical modulator is a device which, in one mode of operation, can diffract light when an ultrasonic sound wave propagates through it. Because holograms may require 1000 line pairs per millimeter, the imagery is usually small, or of low resolution.

It is well known that computational techniques enable the creation of synthetic holograms. Typical holograms require roughly 300 to 2000 lines per mm (ten million samples per square millimeter) for practical diffraction of visible light. This has been a difficult obstacle.

It is computationally difficult to generate the AOM inputs that result in the desired light field. Furthermore, the system uses components such as acousto-optic scanners and galvanometric scanners which are financially prohibitive. This type of system is shown in FIG. 3. A laser 150 illuminates a back of AOMs 154. The AOMs operate in a mode that diffracts the laser light horizontally, generating the constituent "hogels" of the final holographic image. Vertical and horizontal scanners throw the diffracted light to a vertical diffuser 159. An image volume 30 straddles the vertical diffuser 159. The 3D light field is visible by a viewer.

Another method of holographic video uses groups of SLM pixels as holographic fringes. One embodiment of this is described in C. Slinger, B. Bannister, C. Cameron, S. Coomber, I. Cresswell, P. Hallett, J. Hughes, V. Hui, C. Jones, R. Miller, V. Minter, D. Pain, D. Scattergood, D. Sheerin, M. Smith, and M. Stanley, "Progress and prospects for practical electro-holography systems," in Practical Holography XV and Holographic Materials VII, Stephen A. Benton, Sylvia H. Stevenson, and T. John Trout, eds., Proceedings of SPIE v. 4296 (2001). This is depicted in FIG. 4. A laser 250 illuminates an electrically-addressable spatial light modulator (EASLM) 251. An optically addressable spatial light modulator (OASLM) 253 is addressed by a time series of images from EASLM 251 by a replication/relay stage 252. In this way, the speed of the EASLM is traded-off for spatial resolution on the surface of the OASLM. The imagery projected onto the OASLM is a hologram. Each pixel of the EASLM and OASLM are used as constituents of the underlying diffraction patterns. Electrically-addressable SLMs and replication optics project computer-generated hologram image segments onto an optically-addressable SLM (OASLM) for readout. The system requires a high-powered laser and generates low-resolution imagery because each SLM pixel is used within holographic fringes.

In summary, many existing holographic video systems can be schematically illustrated as shown in FIG. 10. A set of basis fringes 355, 360, and 365 are weighted using known techniques after scene generation by a "hogel vector" to form a stream of hogels 370. A "hogel vector" is a sampled hogel spectrum, specifying the diffractive purpose of a hogel. A scanning or tiling system, 154, scans this over hologram plane 340 to generate an image volume 30.

The systems described above suffer from low resolution, demanding computational requirements, and the utilization of costly optical and mechanical components. A system made of volume-reproducable components and existing computational infrastructure is desired which is capable of high-resolution imagery and the ability to better approximate 3D light fields.

SUMMARY OF THE INVENTION

The system described here exploits human persistence of vision in a different way than other known systems. Here, we previously encode a set of basis fringes into a rotating diffractive optical element (DOE). A basis fringe is an elemental fringe pattern computed to contain a particular spectral profile. Linear summations of basis fringes are used to diffract light. This name is analogous to mathematical basis functions. The DOE is addressed optically by a 2D SLM at the appropriate times. As a result, over a time window of about 0.05 sec, the holographic plane is formed by summation over time.

A multi-view parallax display according to this disclosure utilizes a high-resolution 2D image generator (SLM) in which each directional field is generated in its entirety, allowing the resolution of the hologram plane to theoretically equal the SLM resolution. A periodic image scanner, such as a rotating holographic optical element, scans a sequence of directional fields across a range of exit angles. Therefore, a 3D light field is synthesized at high spatial and angular resolution using what is termed spectral multiplexing, since a sequence of angular (or spectral) components is projected in time sequence. Human persistence of vision integrates the sequence of spectral components into a visible image. The system engineer is given flexibility in using the sequence of directional fields as a set of distinct viewpoints, or as components of a more precisely-computed generalized light field using known techniques.

In general, the approach occurs in several steps:

1. Spectral decomposition of the scene: a database of ray trajectories (e.g. point of origin, the angle of the trajectory, the intensity and color) that exit a hologram plane is generated. One method renders or records the scene from multiple viewpoints, such as from a camera moving along a horizontal track, and assigns each snapshot to a different projection time. Another method examines the light field of a 3-D scene and computes the trajectories of the constituent rays that would exit the hologram plane to generate that light field. This is illustrated in FIGS. 8A and 8B. A point source image 2 is positioned near a capture plane 4 which is intended to be visible from viewer position A to viewer position B. The top view of hologram line 4a is illustrated in FIG. 8B. Here, the ray trajectories exiting the point source image 2 are traced back to the hologram line 4a. For hogels i through i+3, beam exit angles are shown. More complex scenes are constructed by summing the contributions of each element of the 3D scene. A hogel (holographic element) is a small functionally diffractive piece of a hologram representing a spatial sample of the fringe pattern and possessing a homogeneous spectrum.

2. Elemental image projection. A high-speed 2D projector projects the spectrally-classified (sorted by ray angle) data in a rapid sequence of 5,000–10,000 frames per second. Typically, the holographic video refresh rate equals this projector rate divided by the total number of ray angles (or, equivalently, the number of perspective viewpoints.) The imagery is projected on or through a scanning element, preferably a rotating diffractive optical element (DOE).

3. View zone scanning. In FIG. 9 a rotating DOE 455 scans the sequence of views across the viewing zone. The DOE is encoded with a varying spatial frequency or a set of spatial frequencies and focusing characteristics. The spatial frequency is a sinusoidal function of the angle on the surface of the DOE. The DOE 455 directs light from the 2D projector at different angels through the hologram plane, resulting in the creation of a visible 3D image. Alternatively, the DOE can scan zero-, one- or two-dimensional light and is also a physical embodiment of basis fringes.

The system described here utilizes the viewer's persistence of vision to sum the basis fringes. Also, it uses the concept of "spectral multiplexing" which gives the system engineer flexibility in how the view zone is scanned, decreases the cost and complexity of fringe generation, and greatly increases system resolution by densely mapping individual projector pixels to hologram plane regions. This is illustrated in FIG. 11. A database is generated of hogel fringe components. An image 20 in image volume 30 is projected from hologram plane 440 by a stream of 2D bitmaps projected by a radiation projector 451 such as a spatial light modulator (SLM), an LED array or other device capable of projecting zero-, one-, two- or three-dimensional radiation through rotating DOE 455. In this way, each pixel of the 2D SLM is mapped to a region in the hologram plane, and its trajectory is generally determined as a function of time (which relates to the scan angle of the DOE.)

Other features and advantages of the invention will be apparent from the following detailed description, and from the claims.

DETAILED DESCRIPTION OF THE INVENTION

Holographic video requires the generation of arbitrary three-dimensional (3D) light fields. A 3D light field can be generated by decomposing the field computationally into components—such as an ensemble of beams with various trajectories and profiles—and projecting these components by a projector whose light is modulated by a multi-region light-shaping element with time-varying properties.

Figure 11:
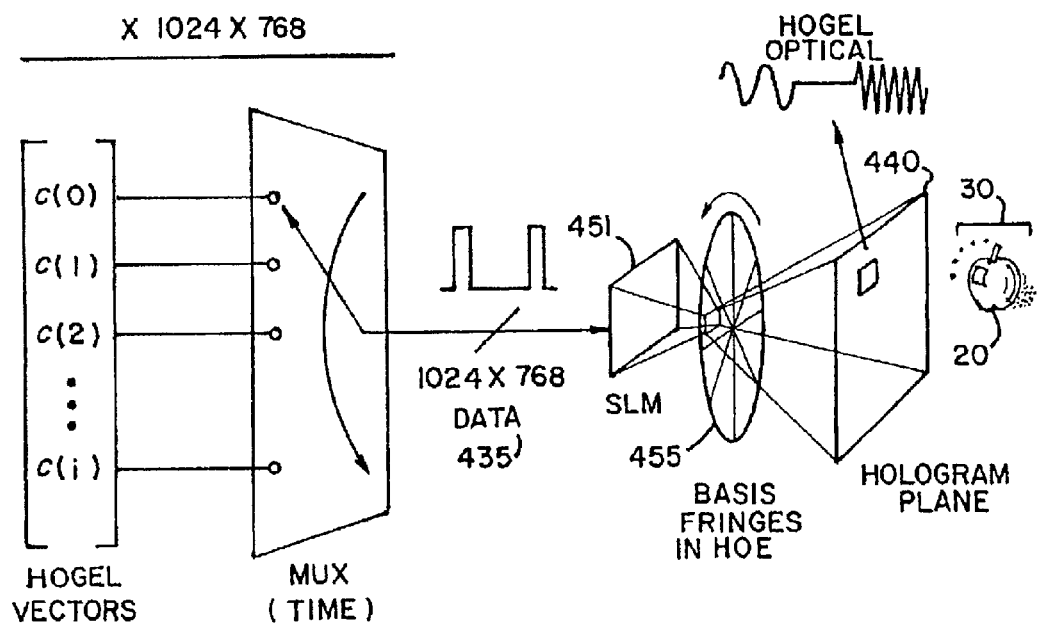
FIG. 11 illustrates the data and optical flow of spectral multiplexing.

In FIG. 11, a 3D image 20 is generated in image volume 30 when the appropriate set of rays exit hologram plane 440. A diffractive optical element (DOE) 455, physically encoded with a diffraction pattern whose frequency is a sinusoidal function of angle, scans a time series of 2D bitmaps that exit a radiation projector 451 such as a spatial light modulator (SLM), an LED array or other device capable of projecting zero-, one-, two- or three-dimensional radiation. The SLM is controlled by a 3D data stream or control signal 435. The data stream 435 comprises a time division multiplexed set of hogel vectors.

First, a database of ray origins and trajectories is created. That is, the output of each hogel can correspond to the images taken by a set of cameras arranged on a line, or can be inferred by backwards ray-tracing from each element of a 3D scene.

Figure 12A:
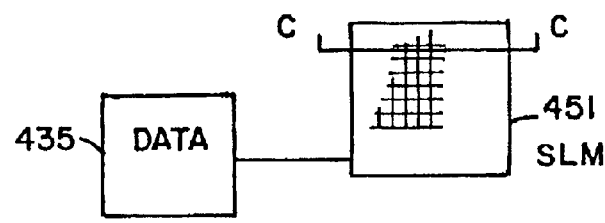
FIG. 12A illustrates one hologram plane line for a point source image.
Figure 12B:
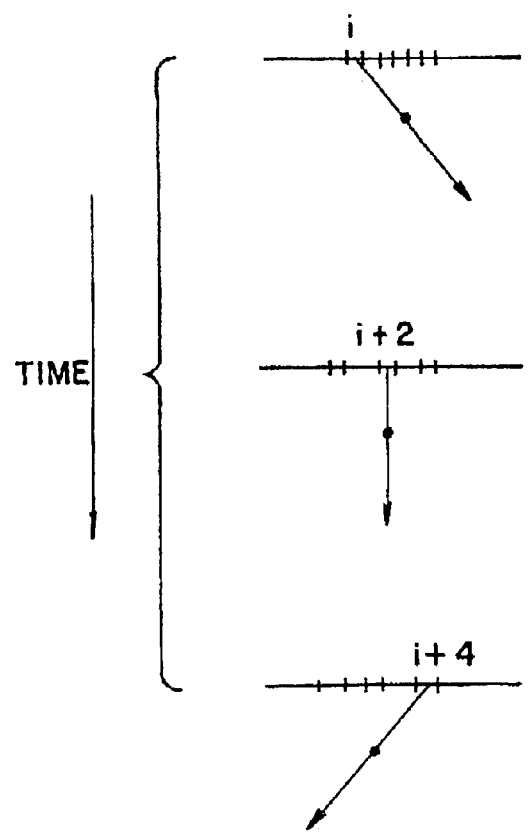
FIG. 12B illustrates the temporal evolution of the hologram plane line for a point source image of FIG. 12A.

See FIG. 12. Once the image database has been created, a data stream 435 activates a 2D SLM 451, such as a ferroelectric liquid crystal display (FELCD) or microelectromechanical system (MEMS) device such as the Texas Instruments Digital Micromirror Device™. Digital (or "deformable") Mirror Device is a trade name of a MEMS-based microdisplay manufactured by Texas Instruments, Inc. A typical DMD is an array of 1024×768 13.7 µm mirrors that are electronically addressable. Each mirror is in an "on" or "off" state, tilting 10–12 degrees. For a point source image 2 located in front of the image plane, we illustrate the activation sequence in time for a single line C of the 2D SLM. In the first time slot, $t_0$, SLM pixel i is activated, so that after beam steering occurs (described below), a ray of light will pass from pixel i through point source 2. In a subsequent time slot, $t_1$, SLM pixel i+2 is activated such that light passes in a direction normal to the hologram plane. In time slot, $t_2$, SLM pixel i+4 is activated such that light exiting it will be steered by a steering component in a direction that again intersects point source 2.

The beam steering is performed by a diffractive optical element (DOE) which may be linear (rectangular) or circular. A typical DOE for this purpose is the spinning-disc diffractive optical element illustrated in FIG. 9. The DOE 455 includes the basis fringes and is etched with a diffraction grating that varies according to Equation 1:

$$f = A \sin(\theta) + B, \quad (1)$$

where f is the spatial frequency of the diffraction grating, A is a scaling factor that determines the ratio of maximum to minimum diffraction grating frequencies 465 and 454, theta is an angular dimension and B is an offset which may be considered to be an angular carrier frequency. The purpose of the disc-shaped DOE 455 is that it causes incident light, such as a laser beam 450, to sweep back-and-forth through a variety of exit angles if the DOE is rotated about the axis that is normal to the plane of the DOE and intersects the center of the DOE. The rotation of the DOE thus provides for a time varying property in the DOE. The coefficients A and B are chosen such that visible light is able to make a maximum excursion of 30° from the angle of incidence. Here theta is a rotational angle measured from a reference angle in the plane of the DOE.

Figure 1A:
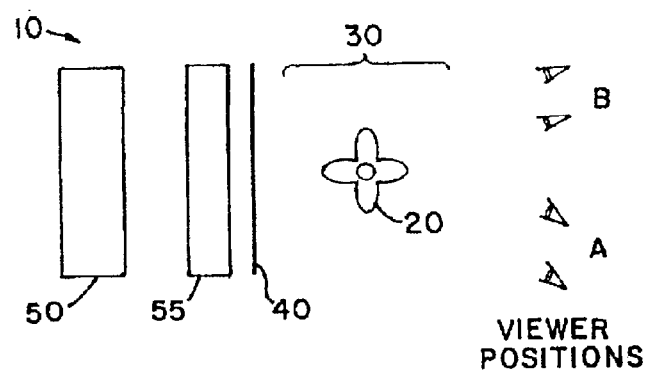
FIG. 1A show a top view of the components of a generalized parallax display.
Figure 1B:
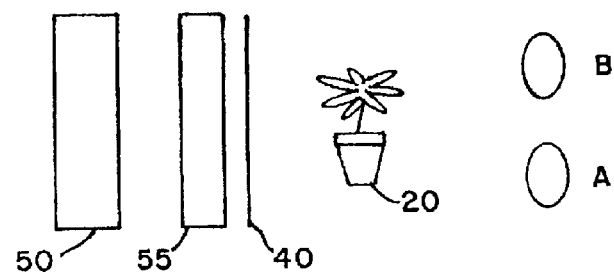
FIG. 1B show a side view of the components of a generalized parallax display.
Figure 2:
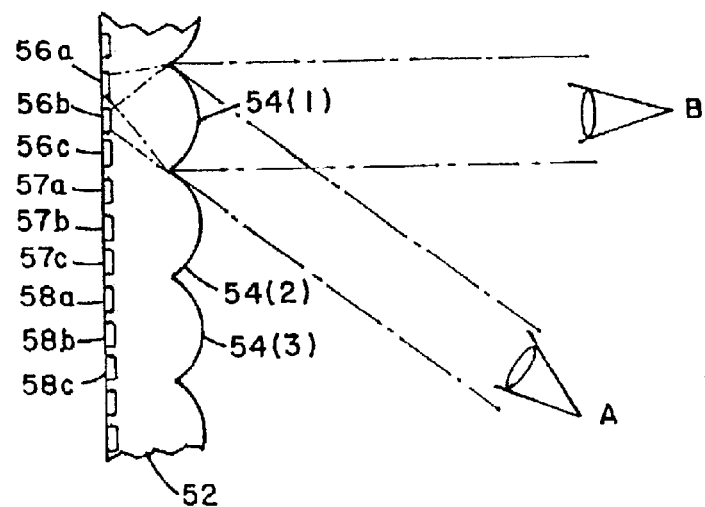
FIG. 2 is a schematic representation of a lenticular screen.
Figure 3:
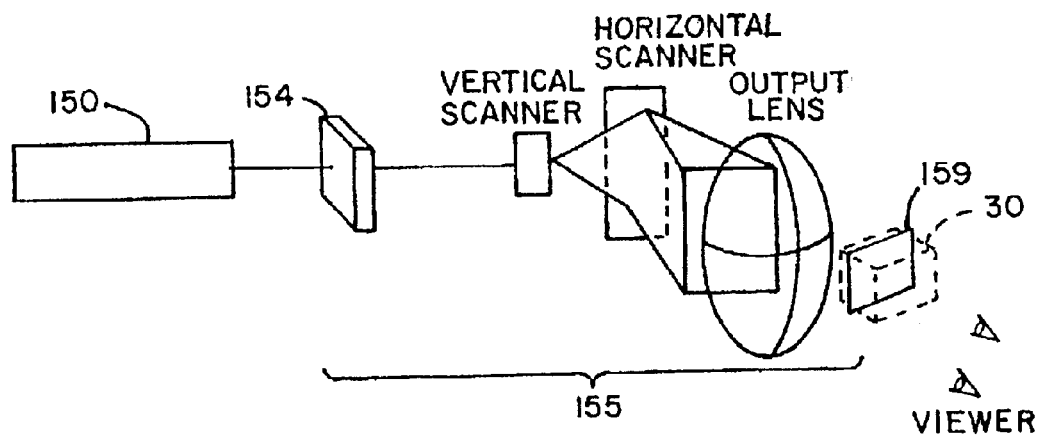
FIG. 3 shows a holographic video system using the scanned image of acousto-optical modulators onto a vertical diffuser.
Figure 4:
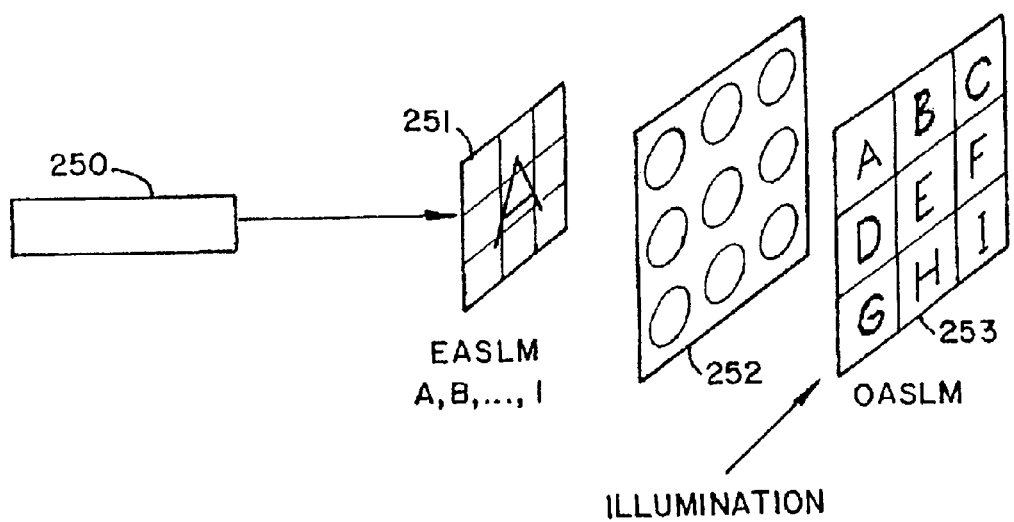
FIG. 4 shows a holographic video system using optical tiling.
Figure 5A:
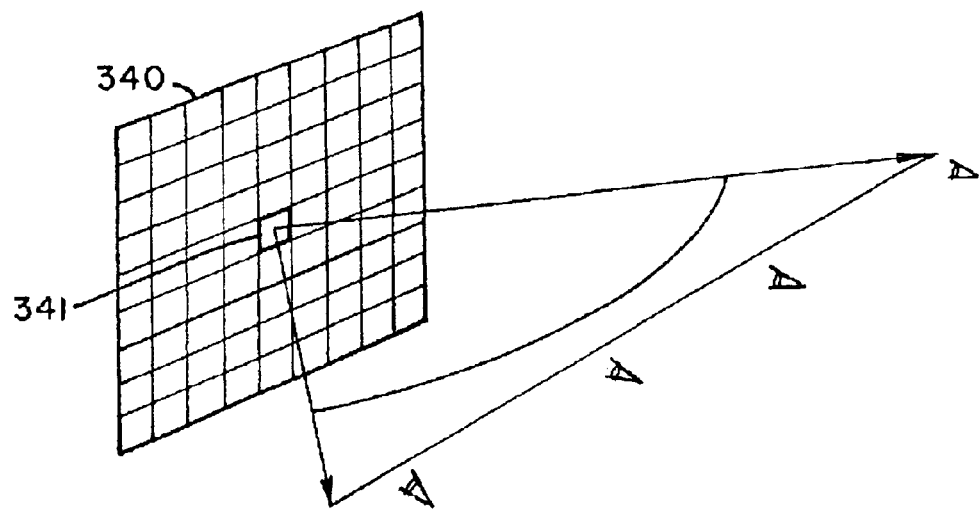
FIG. 5A shows continuous parallax sampling.
Figure 5B:
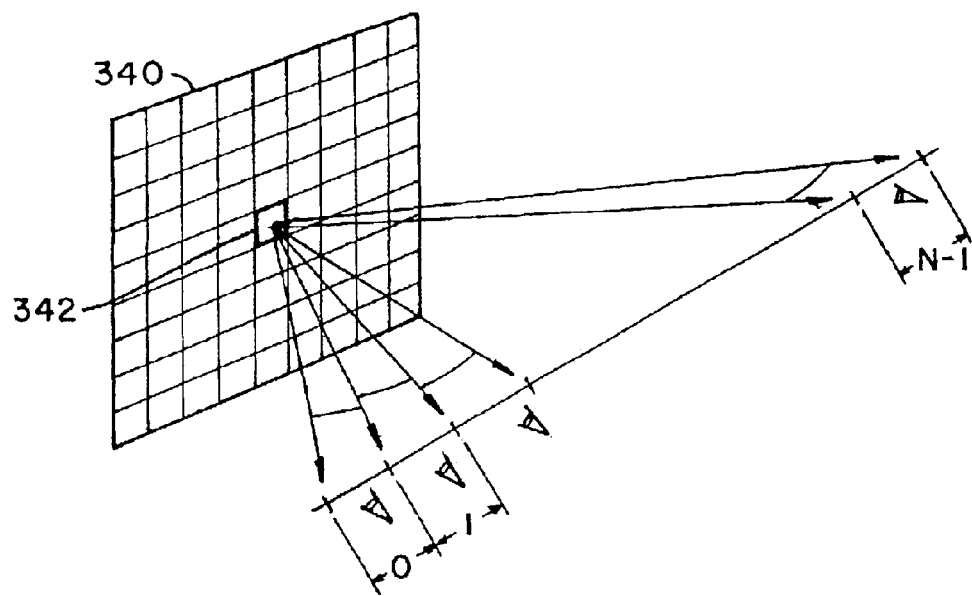
FIG. 5B shows discrete parallax sampling.
Figure 6:
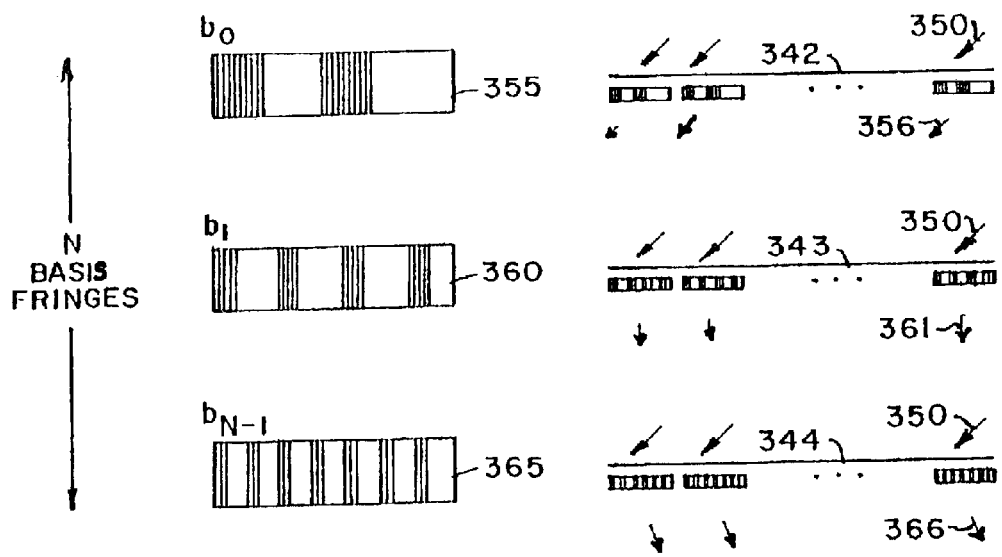
FIG. 6 shows basis fringes and their diffractive effects.
Figure 7:
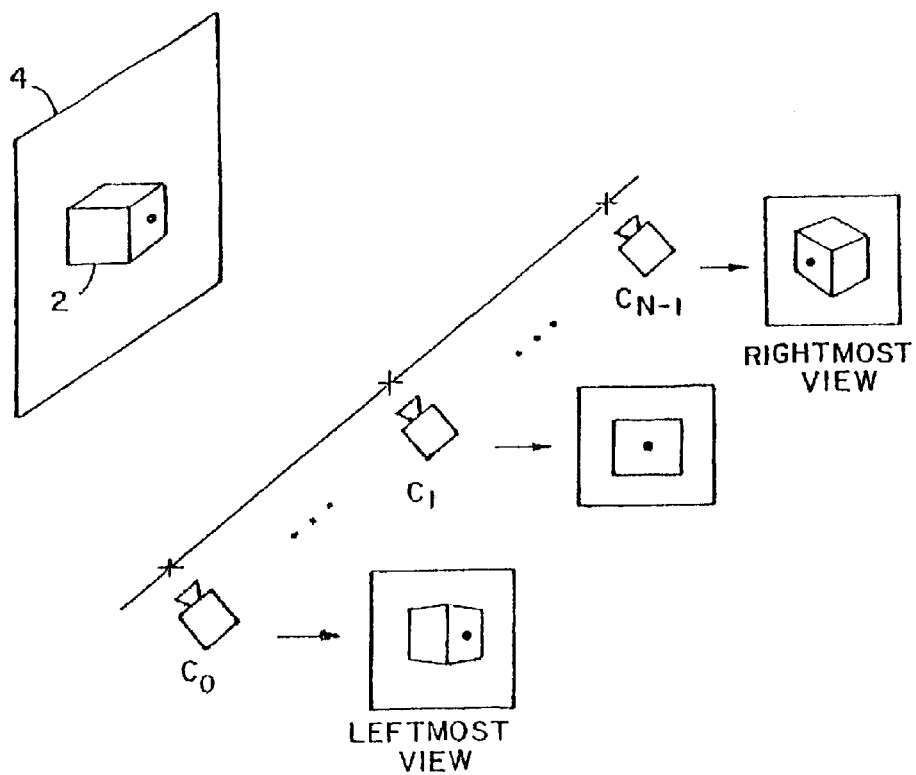
FIG. 7 shows image capture by a set of cameras on a horizontal track.
Figure 8A:
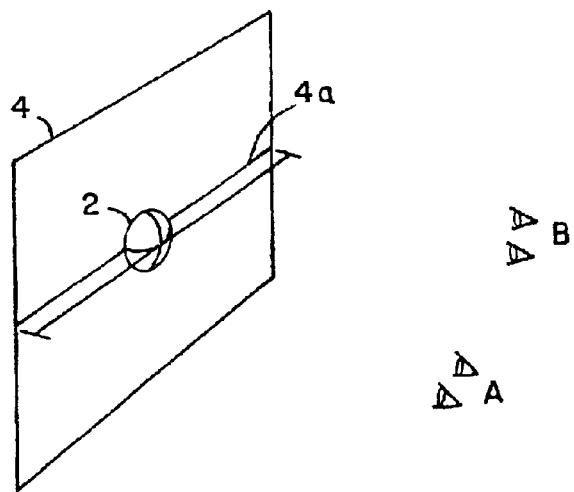
FIG. 8A shows a cross section of a hologram plane for a point source image.
Figure 8B:
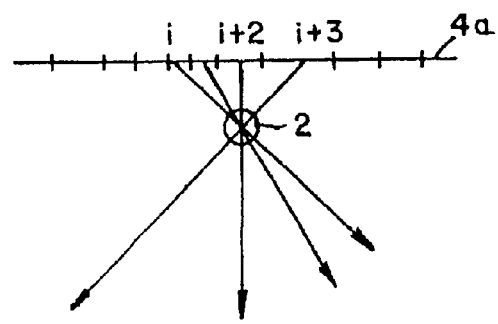
FIG. 8B shows a top view of a cross section of a hologram plane for a point source image.
Figure 9A:
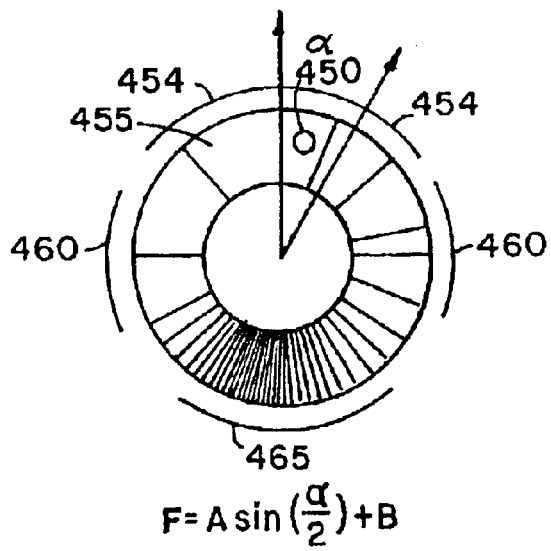
FIG. 9A illustrates a disc-shaped diffractive optical element (DOE)
Figure 9C:
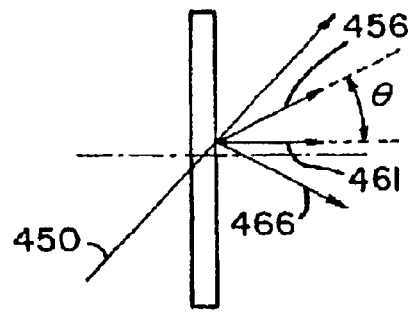
FIG. 9C illustrates a top view of the disc-shaped and rectangular diffractive optical elements (DOE) of FIGS. 9A and 9B.
Figure 9B:
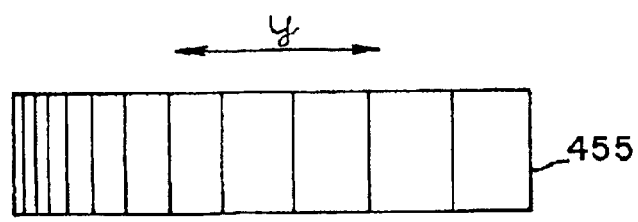
FIG. 9B illustrates a rectangular shaped diffractive optical element (DOE)
Figure 10:
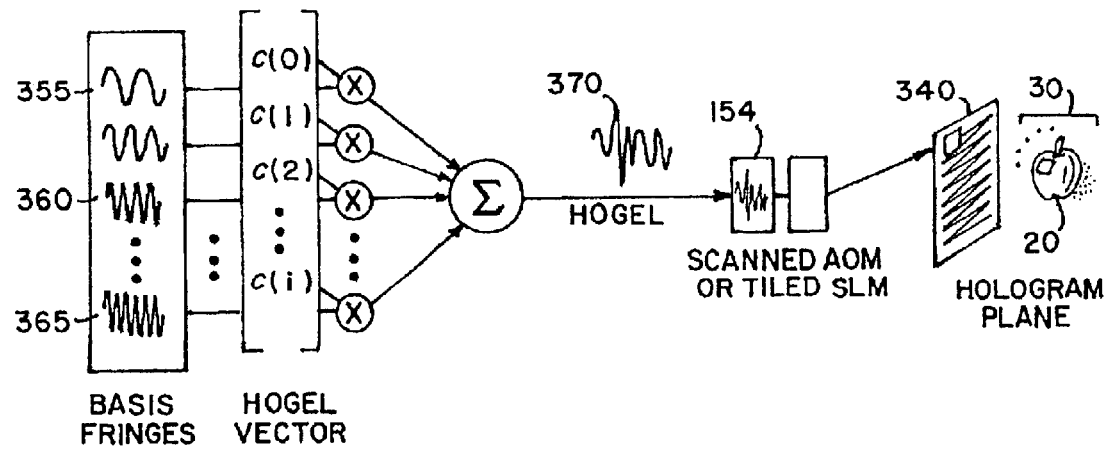
FIG. 10 illustrates the data and optical flow of scanned- or tiled-hogel techniques.

FIG. 9A shows a schematic DOE 455 with angularly increasing and decreasing diffraction grating frequencies. The top view (FIG. 9C) shows how the first order diffraction of incident illumination 450 is steered to a trajectory 456 by DOE region 454. It also illustrates how DOE region 460 steers illumination 450 in direction 461, and likewise DOE region 465 steers the illumination 450 to direction 466. Therefore, when the DOE 455 is spun or rotated about the direction normal to the plane of the DOE, incident light will be scanned in a back-and-forth manner. FIG. 9B shows a schematic DOE 455 with rectilinearly increasing and decreasing diffraction grating frequencies. Therefore, when the DOE 455 is moved back and forth in the "y" direction in the plane of the DOE 455, incident light will be scanned in a back-and-forth or time varying manner.

The DOE 455 allows spectral multiplexing to occur. The DOE 455 acts as the optical equivalent to a lookup table, a device which is typically used in computer programs or electronics in order to speed up calculation. Here, an optical device (the DOE) is encoded with a set of fringes that can be optically addressed when needed. This is better than other techniques (described earlier) in which the illumination source is modulated to create diffraction patterns, wasting resolution. In our case, we modulate the illumination source to address diffraction patterns. The diffraction patterns (the optical lookup table) can take any of a number of forms. It can be previously encoded on a DOE, or can be a predictable set of inputs to an AOM, or can be a galvanometric mirror sweeping back and forth.

Figure 13A:
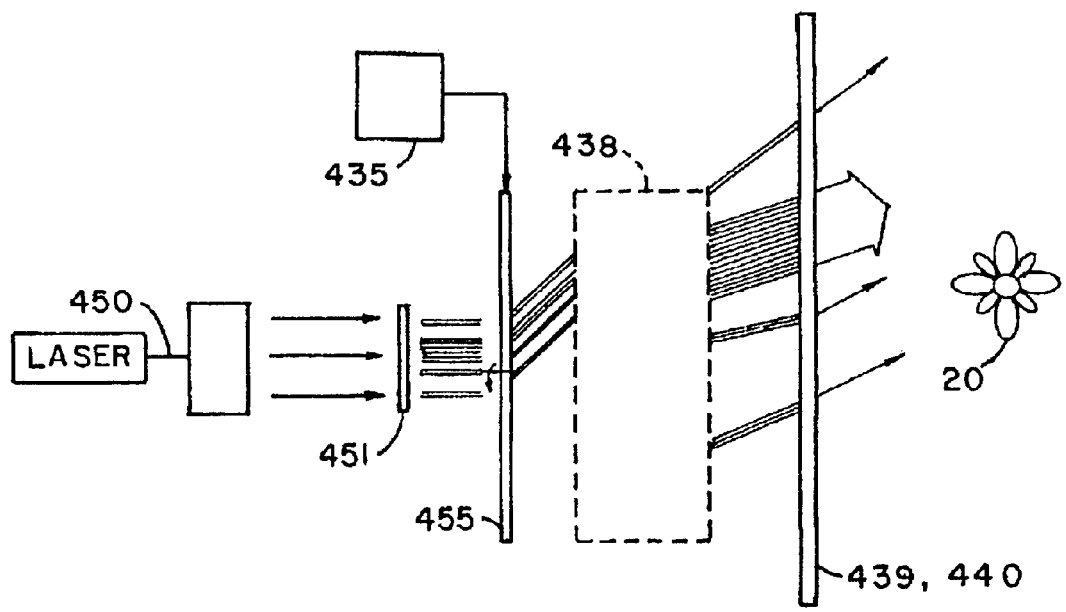
FIG. 13A illustrates a top view of a spectrally-multiplexed display device.
Figure 13B:
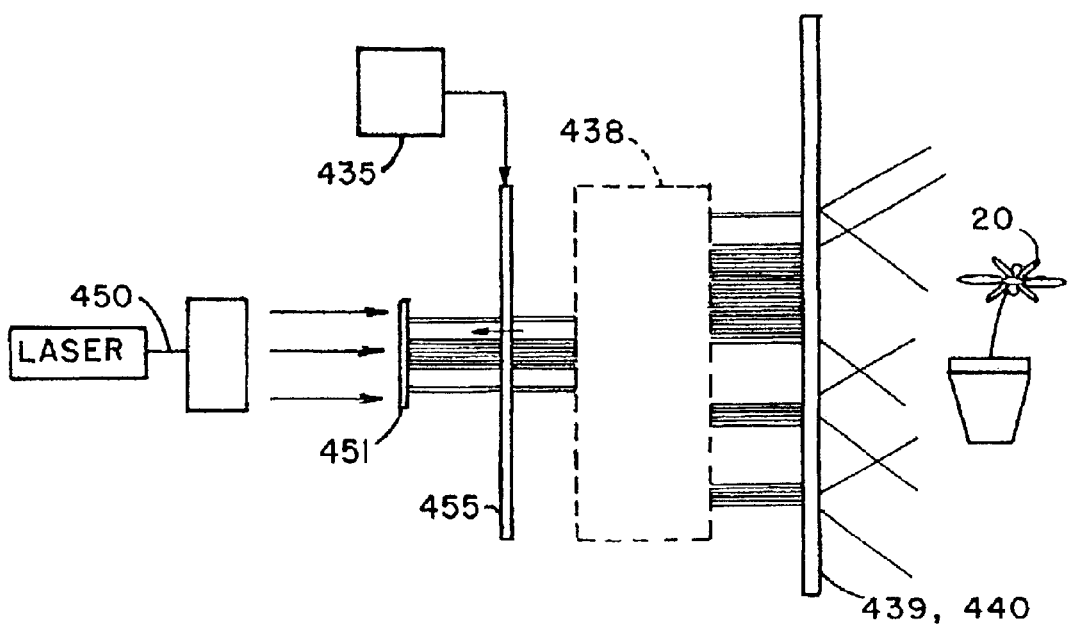
FIG. 13B illustrates a side view of a spectrally-multiplexed display device.

Please see FIG. 13. A laser provides illumination 450 to beam-expansion optics that illuminate the 2D SLM 451. As discussed, the SLM 451 is addressed to activate the time series of pixels that correspond to the desired database of beam origins and trajectories. The SLM modulates the illumination 450 which is steered by rotating DOE 455. For a horizontal parallax only (HPO) holographic video image, the DOE only steers the light in the horizontal plane, as illustrated. Horizontal parallax only describes 3D display systems that provide only horizontal motion parallax. The steered beams are optionally magnified by magnification optics 438 so that the SLM is imaged onto a vertical diffuser 439 which is typically positioned at the hologram plane 440. The vertical diffuser permits an observer to move his head vertically and still see the 3D image 20.

The system that generates the 3D light fields can be used to serve purposes other than visual display. For example, it may be desired to illuminate a moving target. Existing algorithms in the field of computer vision are able to detect the three-dimensional position of a target. One approach of illuminating the target would be to use a spotlight under mechanical control, as directed by the computer vision algorithm. However, it may be undesirable to have large mechanical components, such as a set of two galvanometric scanning mirrors. The system disclosed in this application can be used to replace the spotlight's mechanical mirrors. Given the target's location, an SLM will allow light to pass through the regions of a DOE which result in steering the output beam to illuminate the target. As the target moves, the SLM will again couple the input illumination to the appropriate region of the DOE to illuminate the target. For example, FIG. 12A and FIG. 12B can be interpreted to be illuminating the point 2. As noted above, beam-shaping elements are capable of focusing, as well. Also, as noted elsewhere, the regions of the radiation-shaping element 455 can be diffractive (for beam steering, focusing, wavelength-splitting, etc.) or operate chiefly under geometrical optics (as macroscopic mirrors, lenses, diffusers, etc.). Rather than imposing a set of diffraction gratings on element 455, the element can contain a series of lenslets with varying focal planes.

Therefore, the system disclosed here can also be used as a varifocal projector. Assume the radiation-shaping element 455 contains a series of lenslets with different focal lengths. For example, it is able to focus 2D imagery onto a surface whose distance varies with time. This might be useful as an office projector that is self-focusing. After well-known circuitry detects the distance of a projection screen, a 2D SLM projects a 2D image through the radiation-shaping element at only those times in which the appropriate lenslet is in the beam path from the SLM to the projection screen.

Figure 14:
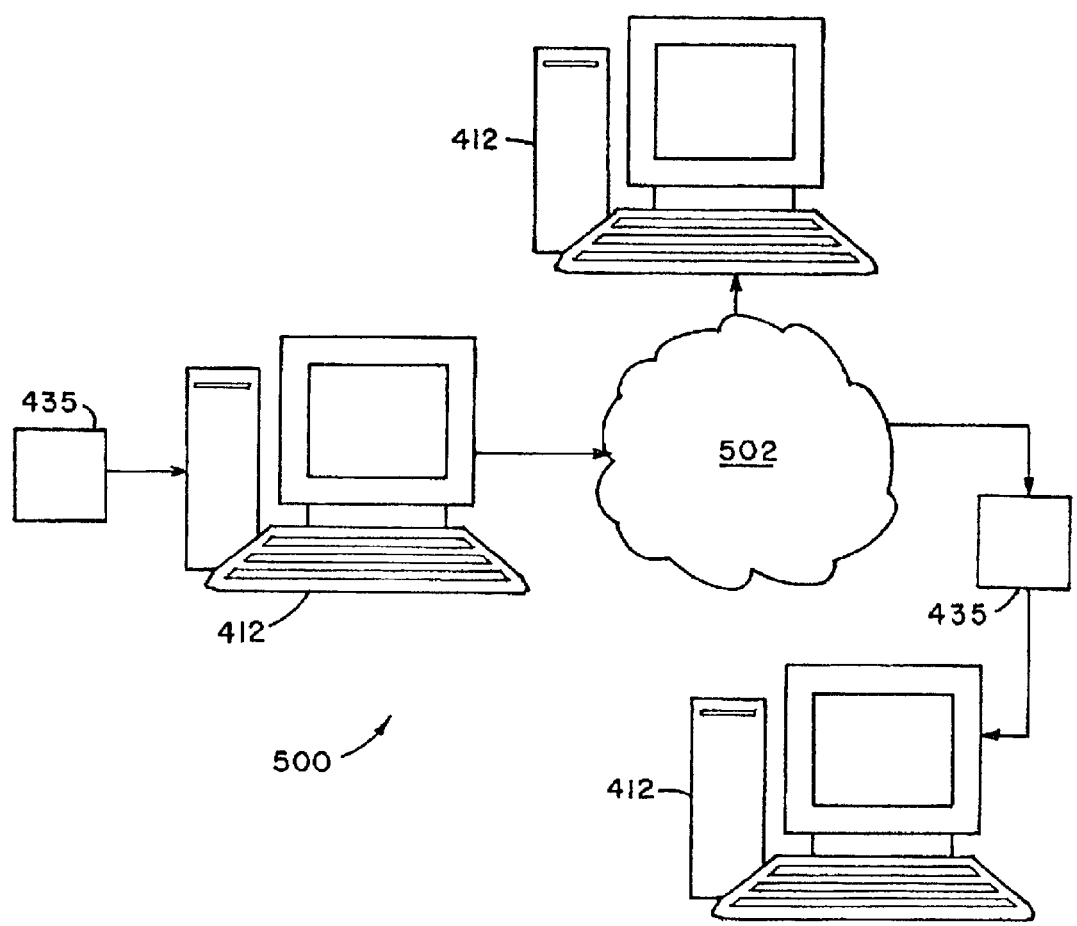
FIG. 14 illustrates a data base of FIG. 13 connected to a communication network.

As seen in FIG. 14, the data base of FIG. 13 which may reside in a personal computer (PC) or server, may be in communication with a network 500 such as a distributed computer or communications network, such as a local area network (LAN) or a wide area network (WAN), a global network (e.g. the Internet) or an intranet 502. The computer network 500 includes at least one personal computer 412 or display device connected to a server from remote geographical locations by wired or wireless connections, by radio based communications, by telephony based communications, or by other network-based communications. The computer 412 or display device may also be connected directly to other like computers or display devices. The computer 412 is in turn similarly connected to other computers 412, display devices or networks through the Internet 502. The computers 412, display devices and other electronic media devices of the networks may be configured to execute computer program software, that allows them to send, receive, record, store and process commands or algorithms between and amongst themselves via the networks and the Internet 502 to read and process the data stored in the data base 435. Such processing of the commands or algorithms includes, for example, various types of encryption, decryption, image compression and decompression algorithms, as well as other types of filtering, contrast enhancement, image sharpening, noise removal and correlation for image classification.

Other DOE patterns are possible to optimize, for example, resolution in a particular zone, or the range of viewing angles. The diffraction frequency of a disc-shaped DOE is mapped directly to its rotational angle. The DOE can alternatively incorporate a different scanning function than sin theta; can include a focusing or diffusing capability; or can utilize a scan angle that is a function of both radius and angle, which may reduce the perception of image flicker. The DOE or scanning element can contain vertical or horizontal diffusing capability. It is usually desirable to incorporate some horizontal diffusion into the DOE so that the viewer sees a continuous transition between view zones (beam trajectories.) The optical-lookup table can be implemented by a scanning mirror, AOM with periodic input, or other elements. Color imagery may be created by using colored illumination, such as red, green, and blue components from a standard projector engine. Dispersion compensation can be performed computationally. Furthermore, animated imagery can be created by software.

For the purposes of this document, "radiation-shaping" or "radiation conditioning" and "light-shaping" or "light conditioning" should be defined to include radiation- (and thus light-) shaping, steering, profile-shaping, focusing, diffusion, and all other types of modulating radiation.

Any reference to first, second, etc., or front or back, right or left, top or bottom, upper or lower, horizontal or vertical, or any other phrase indicating the relative position of one object, quantity or variable with respect to another is, unless otherwise noted, intended for the convenience of description, and does not limit the present invention or its components to any one positional, spatial or temporal orientation. All dimensions of the components in the attached Figures can vary with a potential design and the intended use of an embodiment without departing from the scope of the invention.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference thereto in their entirety. In case of conflict, the present specification, including definitions, will control. In addition, the materials, methods, and examples are illustrative only and not intended to be limiting.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A holographic imaging system comprising:
    a radiation source for generating radiation;
    a data base comprising a set of spectrally decomposed scene elements, each element being indicative of a trajectory of a light ray exiting a point in a recorded scene;
    a spatial light modulator receptive of the radiation from the radiation source and structured to map and display by elemental image projection, each of the elements of the data base individually in time via the spatial light modulator, thereby projecting from the spatial light modulator an optical signal in a time series of two dimensional bitmaps wherein the individual bitmaps are structured to each individually display a spectrally decomposed scene element of the recorded scene from the data base individually in time in the time series; and
    a beam steering device receptive of the projected optical signal from the spatial light modulator for directing the optical signal in a specified direction to reconstruct the recorded scene.

2. The imaging system as set forth in claim 1 further comprising a beam expanding device receptive of the radiation from the radiation source for expanding the radiation.

3. The imaging system as set forth in claim 1 further comprising a collimating device receptive of the radiation from the radiation source for collimating the radiation.

4. The imaging system as set forth in claim 1 wherein the beam steering device comprises a diffractive optical element.

5. The imaging system as set forth in claim 4 wherein the diffractive optical element comprises a diffraction grating.

6. The imaging system as set forth in claim 5 wherein the diffraction grating comprises a grating pattern having a spatial frequency defined by the mathematical equation:

$$f = A\sin(x) + B$$

wherein f is the spatial frequency of the grating pattern, A is scaling factor that determines the ratio of maximum to minimum diffraction grating frequencies, x is a spatial dimension and B is a carrier frequency offset factor.

7. The imaging system as set forth in claim 6 wherein x is linear dimension.

8. The imaging system as set forth in claim 6 wherein x is an angular dimension.

9. The imaging system as set forth in claim 1 further comprising a beam magnifier receptive of light from the beam steering device.

10. The imaging system as set forth in claim 1 further comprising a diffuser receptive of light from the beam steering device for diffusing the light.

11. The imaging system as set forth in claim 1 wherein the data base comprises a set of elements derived from a record of the scene from at least one view point.

12. The imaging system as set forth in claim 1 wherein the data base comprises a set of elements derived from a ray trace of a light ray exiting a point in the scene to a plane.

13. The imaging system as set forth in claim 1 further comprising:
a multiplexer receptive of the element of the data base for multiplexing the elements of the data base to the spatial light modulator; and
a timing device for synchronizing the multiplexing of the elements of the data base to the spatial light modulator and the directing of the optical signal in a specified direction.

14. The imaging system as set forth in claim 1 wherein the diffraction grating comprises a grating pattern defined by a set of basis fringes.

15. The imaging system as set forth in claim 1 wherein the data base is connected to remote spatial light modulator by way of a computer or communications network.

16. A holographic imaging system comprising:
a radiation source for generating radiation;
a data base comprising a set of elements, each element indicative of a trajectory of a light ray exiting a point in a recorded scene;
a spatial light modulator receptive of the radiation from the radiation source and the elements of the data base mapped to the spatial light modulator, thereby projecting from the spatial light modulator an optical signal in a time series of two dimensional bitmaps of the recorded scene wherein the individual bitmaps are structured to each individually display an element of the recorded scene from the data base individually in time in the time series;
a diffractive optical element including a set of basis fringes receptive of the projected optical signal from the spatial light modulator for diffracting the optical signal in a specified direction;
a multiplexer receptive of the elements of the data base for multiplexing the elements of the data base to the spatial light modulator; and
a timing device for synchronizing multiplexing the elements of the data base to the spatial light modulator and diffracting the optical signal in a specified direction.

17. A holographic imaging method comprising;
establishing a data base comprising a set of elements, each element indicative of a trajectory and an origin of a light ray exiting a point in a recorded scene;
mapping each element of the data base in a time series onto a spatial light modulator;
directing radiation onto the spatial light modulator;
projecting an optical signal from the spatial light modulator in a time series of two dimensional individual bitmaps wherein the individual bitmaps each individually display an element of the recorded scene from the data base individually in time in the time series;
diffracting the optical signal projected from the spatial light modulator with a set of basis fringes.

18. The method as set forth in claim 17 wherein establishing a data base comprises:
recording the scene from at least one view point; and
assigning a unique time designation to each of the view points of the recorded scene.

19. The method as set forth in claim 17 wherein establishing a data base comprises:
examining the light field of the recorded scene; and
ray-tracing the trajectory and origin of a light ray exiting a point in the scene to a plane.

20. The method as set forth in claim 17 wherein diffracting the optical signal comprises scanning the optical signal from the spatial light modulator with a diffraction grating having a grating pattern with a spatial frequency defined by the mathematical equation:

$$f = A \sin(x) + B$$

wherein f is the spatial frequency of the grating pattern, A is scaling factor that determines the ratio of maximum to minimum diffraction grating frequencies, x is a spatial dimension and B is an offset carrier frequency.

21. The method as set forth in claim 20 further comprising diffusing the scanned optical signal.

22. The method as set forth in claim 17 wherein diffracting the optical signal comprises scanning the optical signal emanating from the spatial light modulator with a diffraction grating having a set of basis fringes.

23. The method as set forth in claim 22 wherein scanning the optical signal from the spatial light modulator comprises scanning the optical signal at a rotational rate of approximately one twentieth of a second per basis fringe.

24. The method as set forth in claim 17 wherein projecting an optical signal from the spatial light modulator in the nature of a two dimensional bitmap of the recorded scene comprises projecting the bitmap at a rate of approximately 4,000 to 10,000 frames per second.

25. The method as set forth in claim 17 wherein mapping each element of the data base onto a spatial light modulator comprises multiplexing the elements of the data base to the spatial light modulator.

26. The method as set forth in claim 17 further comprising synchronizing multiplexing the elements of the data base to the spatial light modulator and diffracting the optical signal projected from the spatial light modulator.

* * * * *